M. Smith,
Horse Rake.

No. 47,872  Patented May 23, 1865.

Witnesses  
J. Henry Hill

Moses Smith  
by his Attorney  
Theo. H. Dodge

UNITED STATES PATENT OFFICE.

MOORE SMITH, OF WORCESTER, MASSACHUSETTS, ASSIGNOR TO HIMSELF AND T. W. WELLINGTON, OF SAME PLACE.

IMPROVEMENT IN HORSE-RAKES.

Specification forming part of Letters Patent No. 47,872, dated May 23, 1865.

*To all whom it may concern:*

Be it known that I, MOORE SMITH, of the city and county of Worcester, and State of Massachusetts, have invented certain new and useful Improvements in Horse-Rakes; and I do hereby declare that the following is a full, clear, and exact description of the construction and operation of the same, reference being had to the accompanying drawings, in which—

Figure 2:
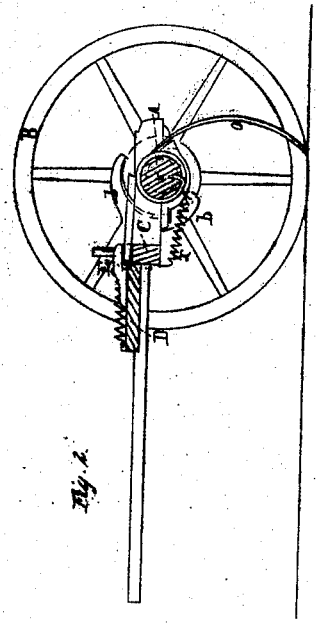
Figure 3:
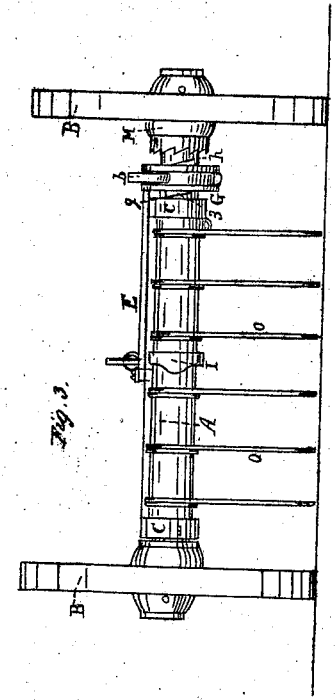
Figure 1:
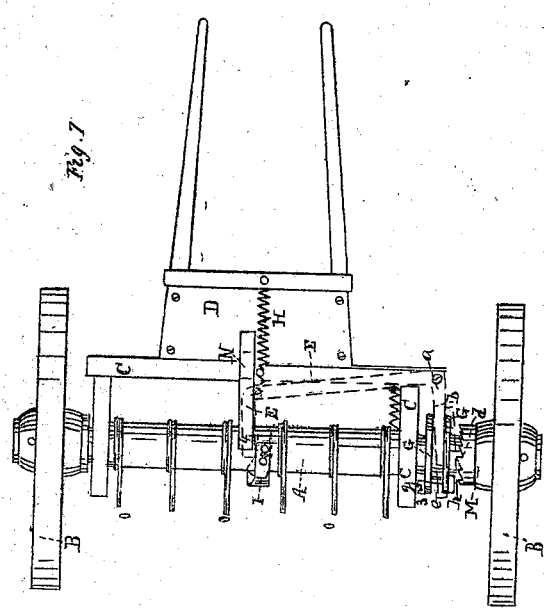

Figure 1 represents a top view of said rake. Fig. 2 represents a longitudinal vertical section through the same. Fig. 3 represents a rear view of my rake.

A represents the axle of the rake, which serves as the rake-head, to which the rake-teeth O are secured. It is supported on the wheels B, the latter turning loosely on the spindles of the axle. The frame C is hung upon the axle, and the driver's platform D is secured to the frame C.

E represents a clutch-lever, which is pivoted to the frame C at *a*. Its forked ends *b* extend into the groove *c* of the double-faced clutch G, which moves with and can slide longitudinally on the axle A, and which is provided at each face with a clutch-tooth, the clutch-tooth 2 on the outer face to be acted upon at proper intervals by one of the teeth *d* on the inner face of the wheel-hub M, and the tooth 3 on the inner face of the clutch to bear against the projection *g* of the frame C, to keep the rake-head in its position while the rake is in operation, the clutch being retained in its last-named position by the action of the spring H upon the clutch-lever, which tends to pull the latter forward against the stop-plate N.

I represents a cam on the axle or rake-head A, which acts upon the end 4 of the clutch-lever E to operate the latter at a certain moment.

The operation of the rake is as follows: As the rake is drawn over the field, the rake-teeth O are held in their positions by the action of the clutch-tooth 3 upon the projection *g* on the main frame. When a sufficient quantity of hay has accumulated upon the rake-teeth, the driver forces the end 4 of the lever E to the rear, and thus shifts the clutch G toward the wheel B, disconnecting it from the projection *g* on the frame C, and connecting it with the clutch-teeth *d* of the wheel-hub M, and as the machine is moved forward the rake-head or axle A is turned by the rotary motion of the wheel B and with the full power of the team, and the hay is dropped; but this rising motion of the rake-teeth continues only a sufficient time to release the hay, and immediately after the cam I on the rake-head A comes in contact with the end 4 of the lever E and forces the latter forward, thus disengaging the clutch G from the hub of the wheel B and again locking the rake-head, and the operation of raking continues.

Thus it will be seen that this rake is to a great extent self-acting, that the driver has no laborious work to perform in lifting levers or turning or raising the rake-head when the teeth are loaded with hay, but that such heavy part of the work is performed by the power of the team, and that after the hay is unloaded the rake automatically resumes its operation.

The driver's seat is to be attached to the frame C in any suitable manner and in a convenient position for him to operate the lever E, which can be done by any well-known device.

In the full-sized machine the weight of the teeth will obviate the use of the spring *x*, and cam I may be so constructed as to throw the clutch into action with the projection *g*, and thus do away with the spring H.

Having thus fully described the nature of my invention, what I claim herein as new, and desire to secure by Letters Patent, is—

The combination of the tilting rake-head A with the clutch G, clutch projections *g* and *d*, clutch-lever E, and cam I, when constructed and operated substantially in the manner and for the purposes stated.

MOORE SMITH.

Witnesses:
W. L. FULLER,
J. HENRY HILL.